April 8, 1958   J. LONG   2,829,423
APPARATUS FOR ASSEMBLING ELECTRICAL DEVICES
Filed Oct. 10, 1950   11 Sheets-Sheet 3
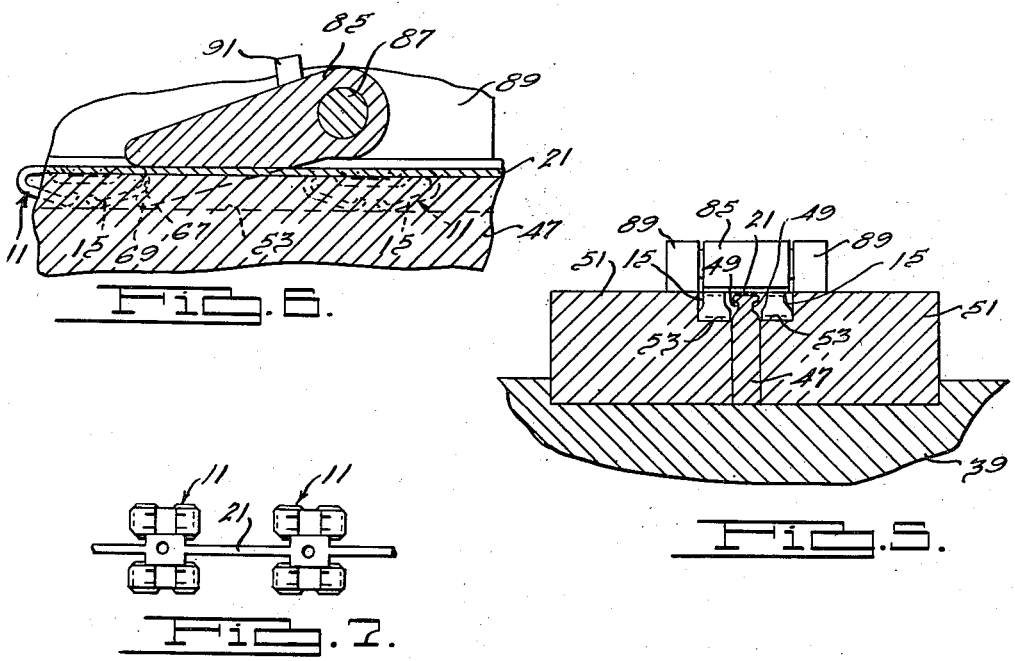
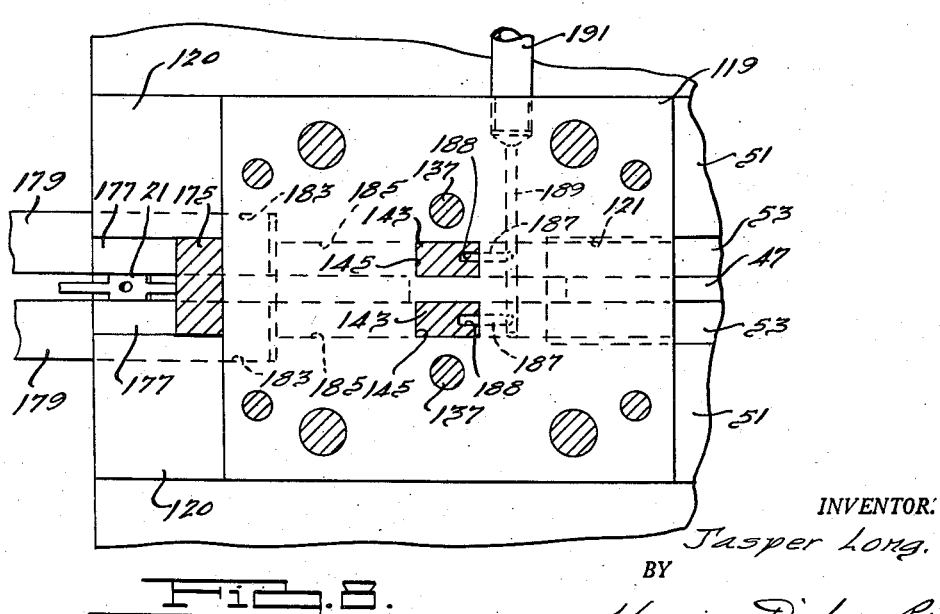
INVENTOR:
Jasper Long.
BY
Harness, Dickey & Pierce
ATTORNEYS.

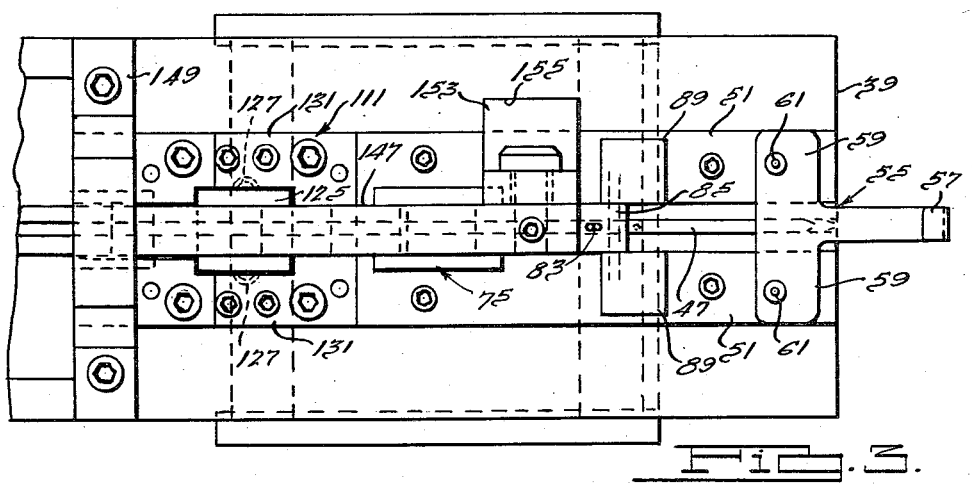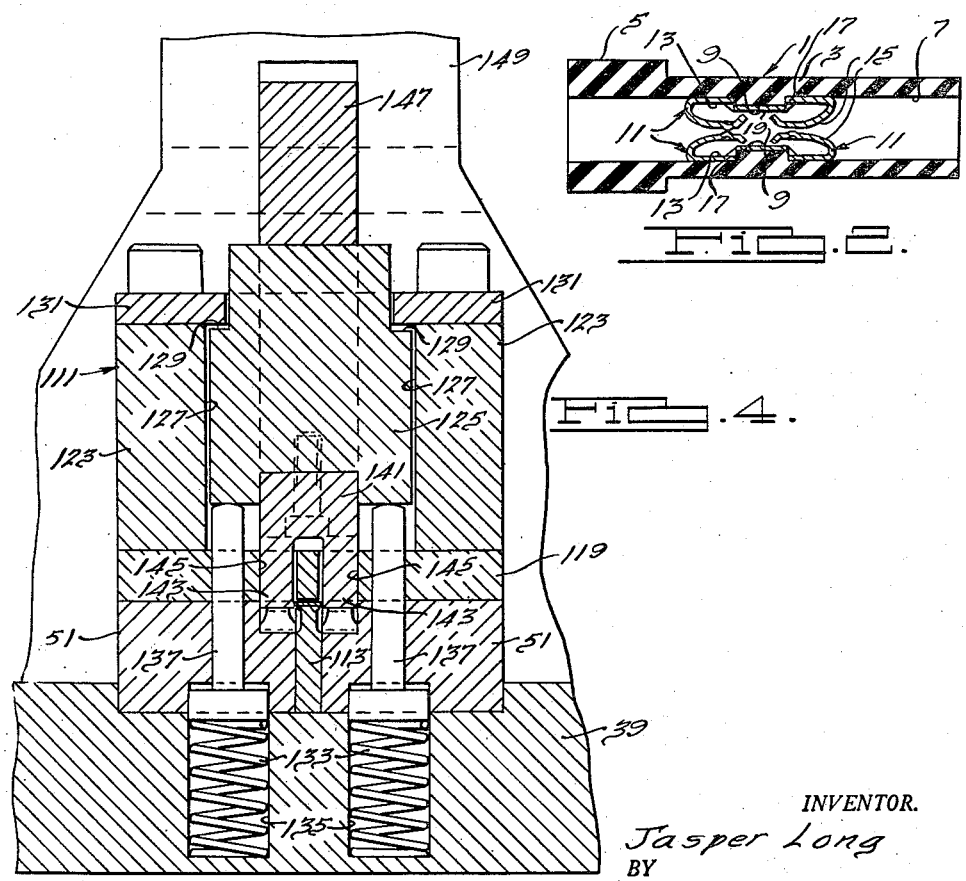

April 8, 1958            J. LONG            2,829,423
APPARATUS FOR ASSEMBLING ELECTRICAL DEVICES
Filed Oct. 10, 1950            11 Sheets-Sheet 4
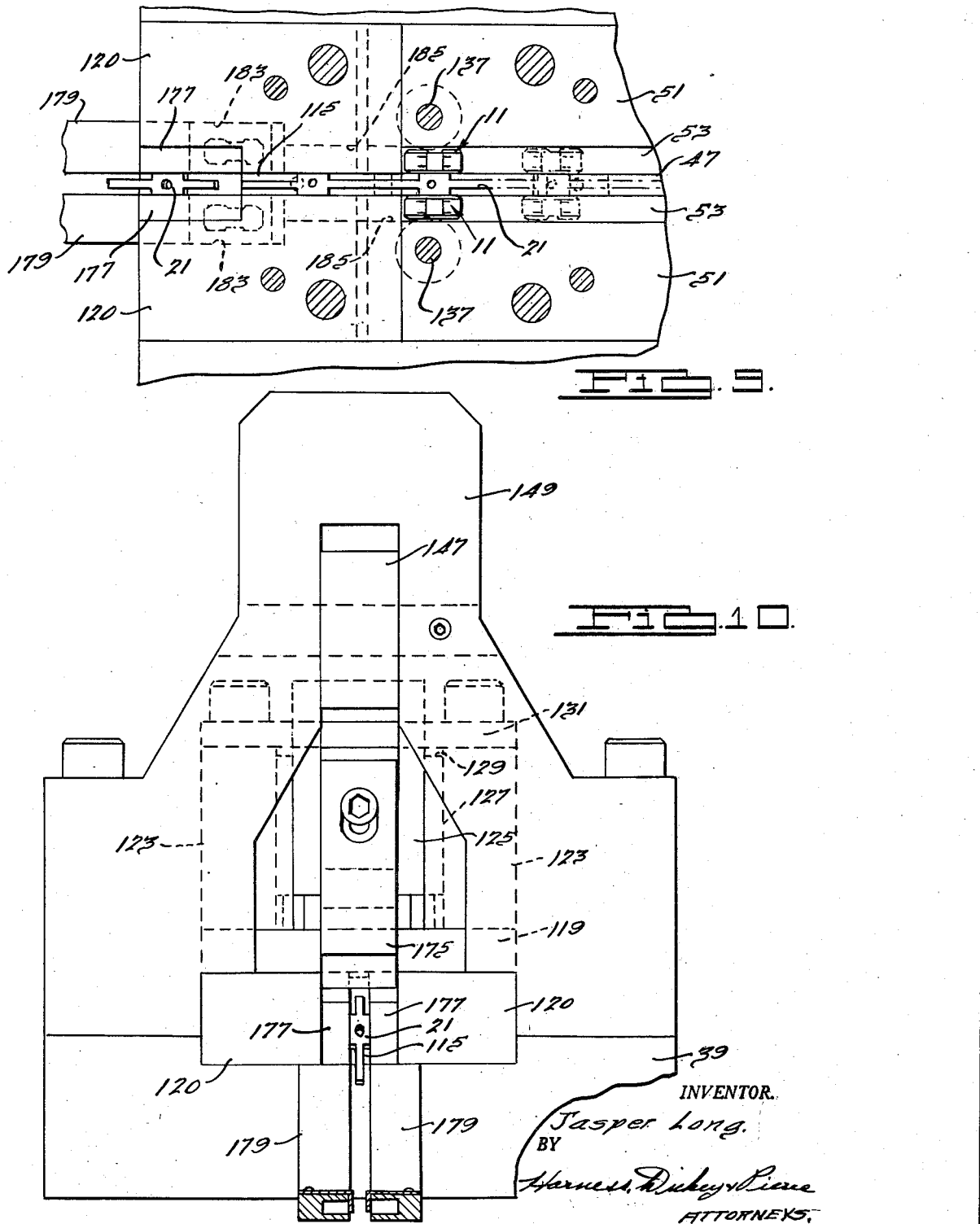
INVENTOR.
Jasper Long.
BY
Harness, Dickey & Pierce
ATTORNEYS.

April 8, 1958  J. LONG  2,829,423
APPARATUS FOR ASSEMBLING ELECTRICAL DEVICES
Filed Oct. 10, 1950  11 Sheets-Sheet 5
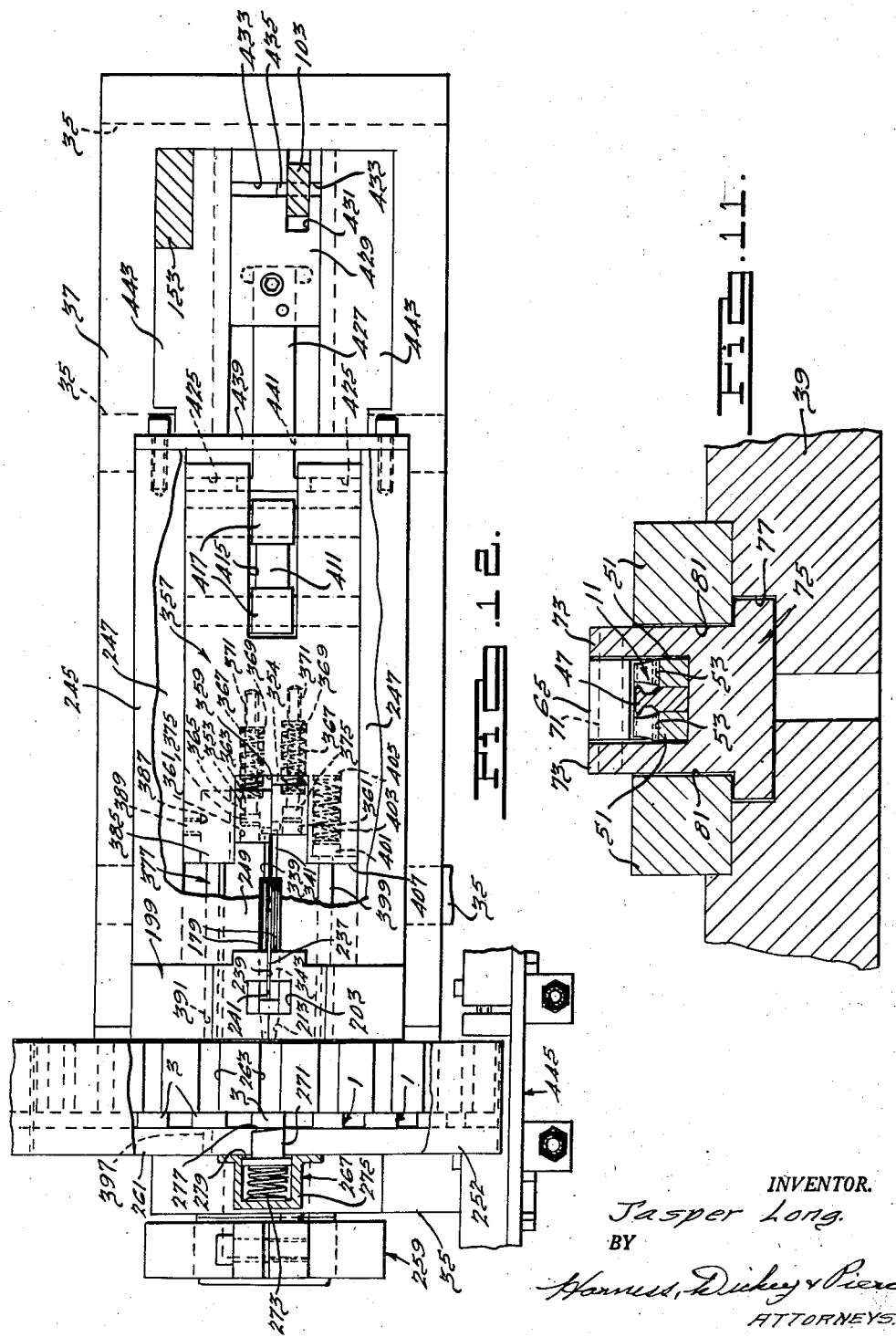
INVENTOR.
Jasper Long.
BY
Harness, Dickey & Pierce
ATTORNEYS.

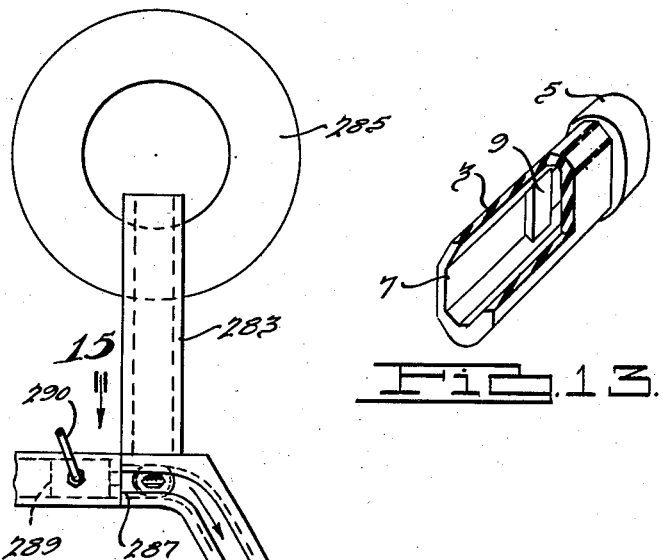
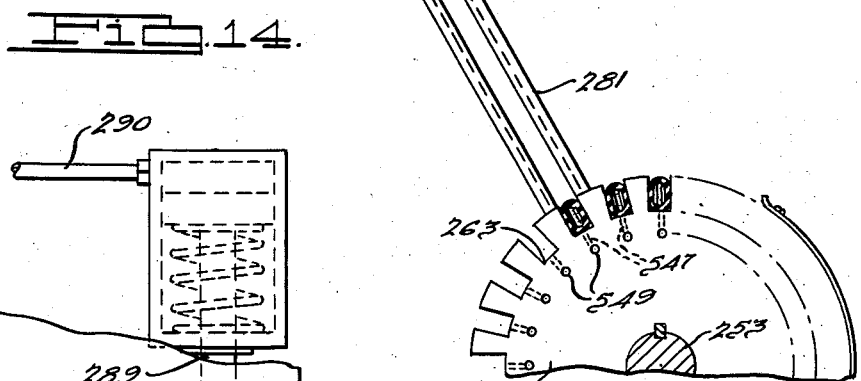
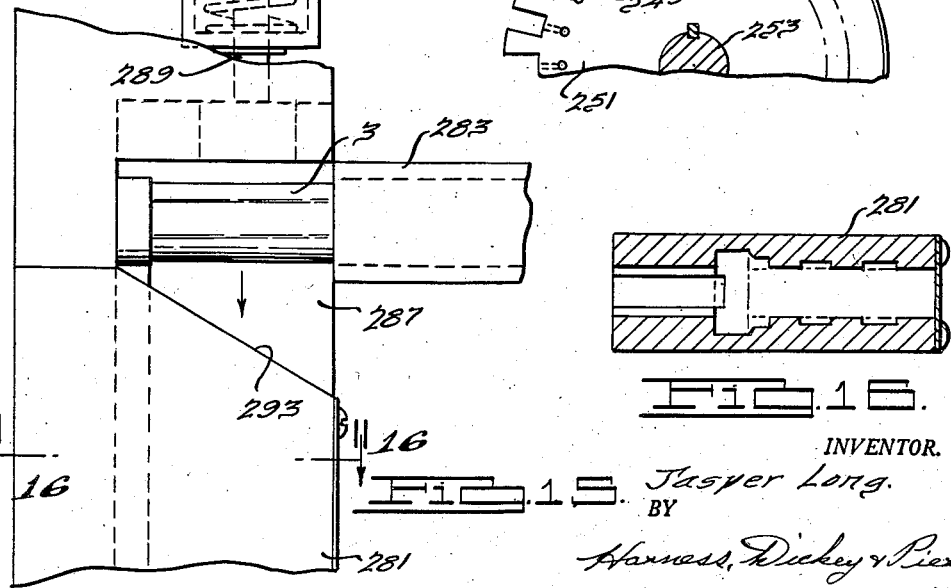

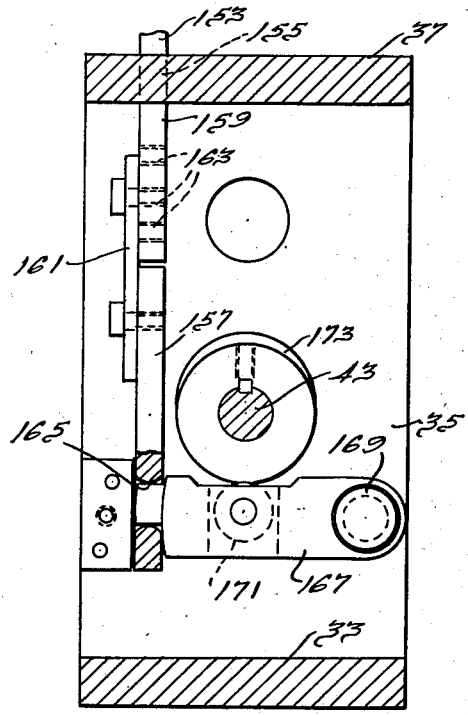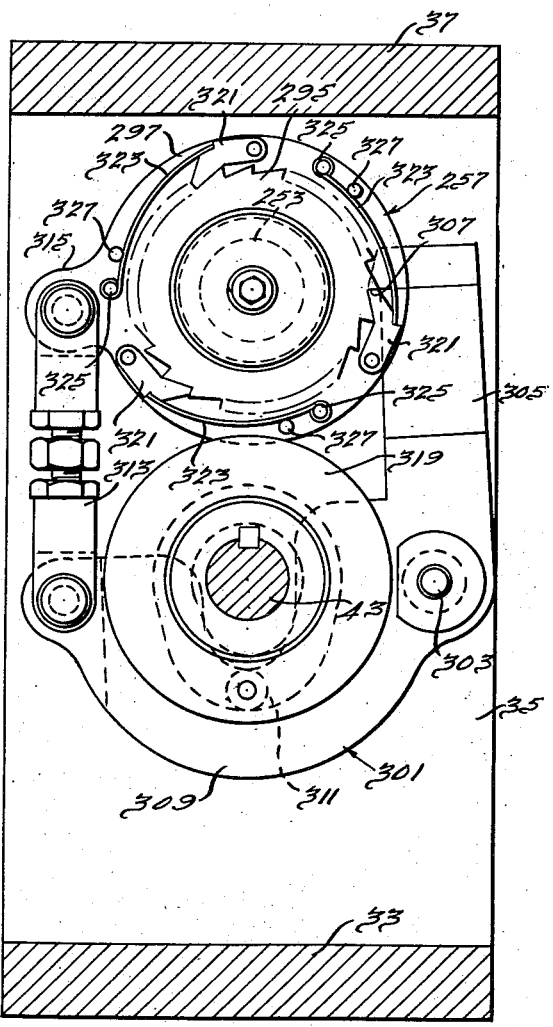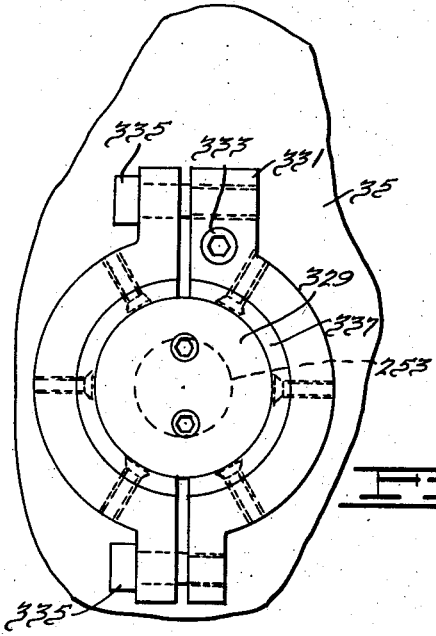

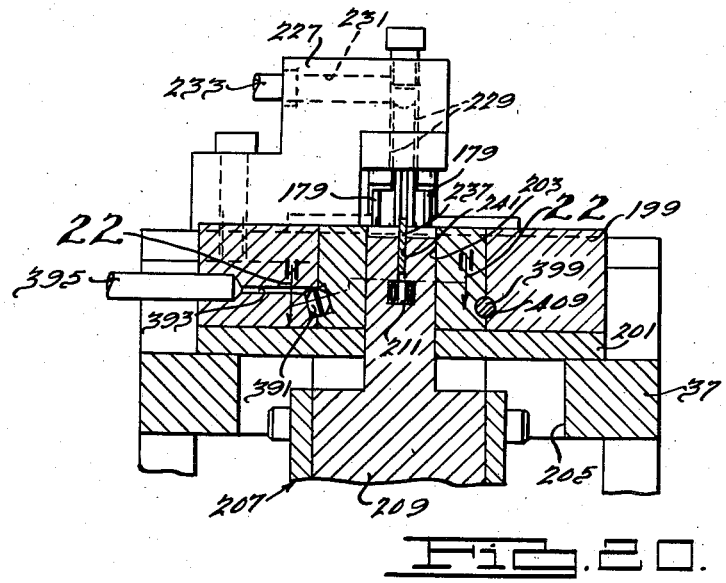
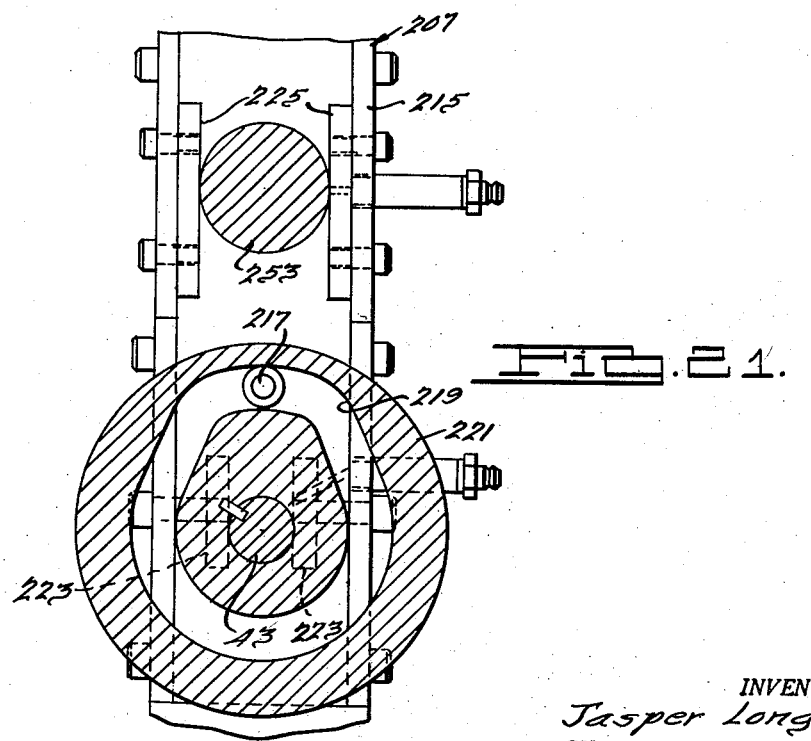

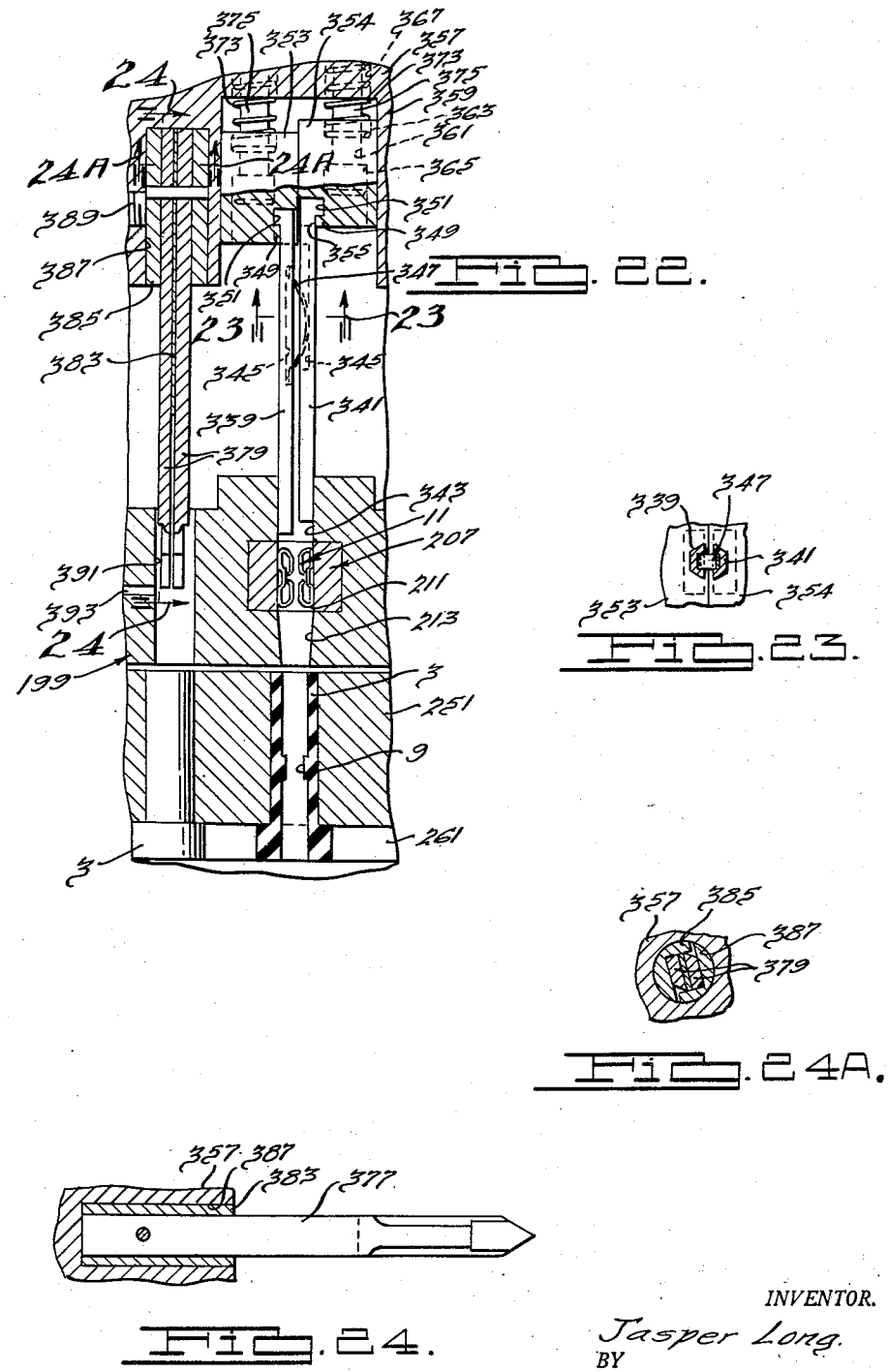

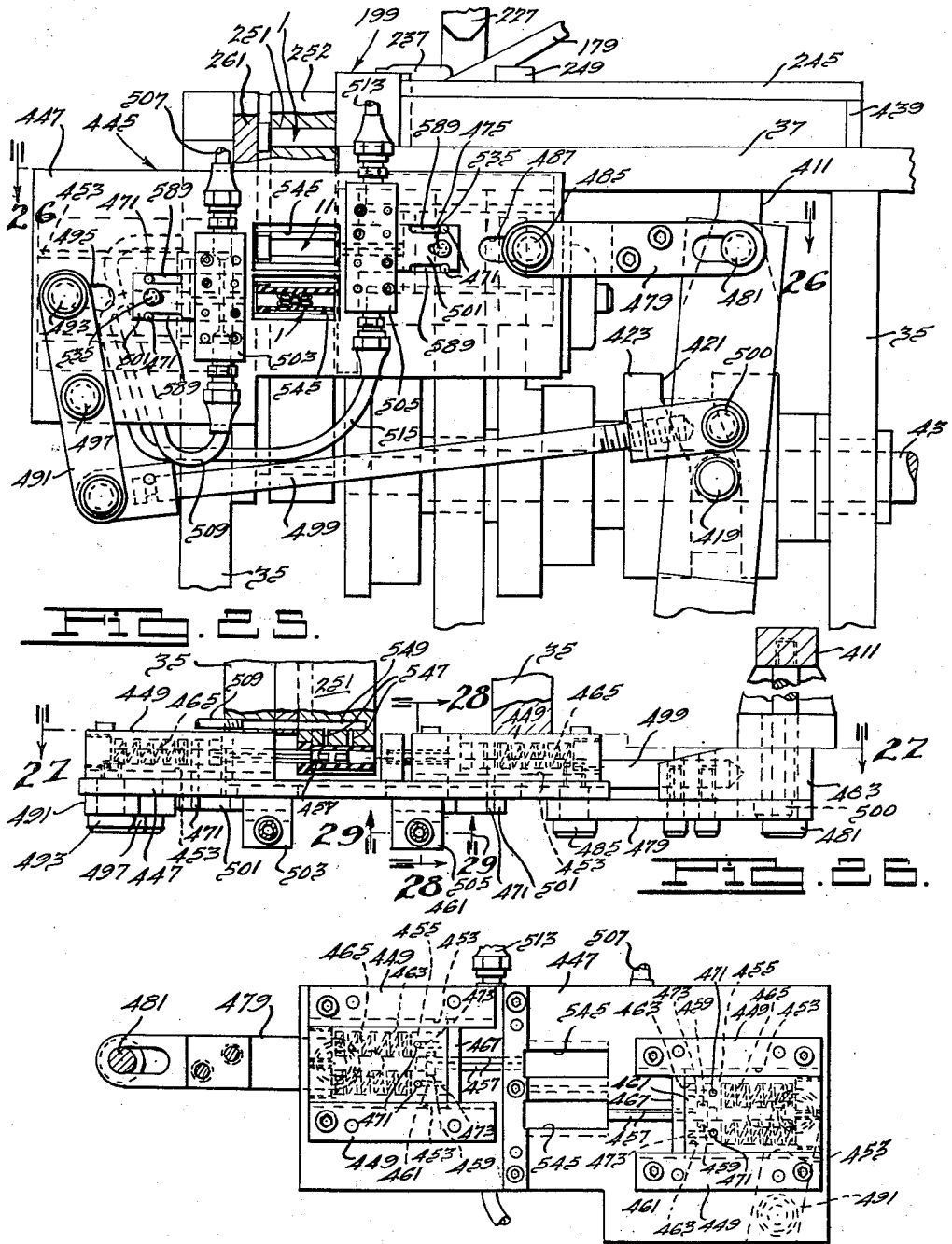

April 8, 1958 J. LONG 2,829,423
APPARATUS FOR ASSEMBLING ELECTRICAL DEVICES
Filed Oct. 10, 1950 11 Sheets-Sheet 11

INVENTOR.
Jasper Long.
BY
Harness, Dickey & Pierce
ATTORNEYS.

United States Patent Office 2,829,423
Patented Apr. 8, 1958

2,829,423

APPARATUS FOR ASSEMBLING ELECTRICAL DEVICES

Jasper Long, Sturgis, Mich., assignor to Wade Electric Products Co., Sturgis, Mich., a corporation of Michigan Application October 10, 1950, Serial No. 189,376

9 Claims. (Cl. 29—33)

This invention relates broadly to assembly apparatus and, in particular, to the assembly of electrical connectors that comprise housings and contacts that are seated within the housings. The purpose of the invention is to provide a machine and mechanical method for assembling connectors from the elements which comprise them. The embodiment of the invention illustrated and described herein is adapted to assemble connectors of the type disclosed and claimed in the inventor's copending application entitled "Electrical Connector," filed September 2, 1949, Serial No. 113,833, now Patent No. 2,703,395, but it is obvious that the principles of the invention may be embodied in such form as to assemble other types of connectors.

Connectors of the type referred to are a truly mass production item, millions of them being used each year in the automobile industry alone. In the past, however, connectors have been assembled by hand at a much greater cost and much slower rate of production than possible by mechanical methods. The present invention enables the improved form of connector disclosed in the aforementioned copending application to be rapidly and properly assembled and may be readily adapted to produce other types of connectors as well.

The machine of this invention accepts the connector housings in batches and the contact elements in the form of a long metal ribbon or strip that has had the contacts pressed therein but not severed therefrom. The machine severs the contact elements from the strip and then automatically feeds them to a different location from which they are pushed into housings that have been separated from the batch and individually moved to the point of assembly.

The machine automatically performs various other operations in addition to severing the elements from the strip and inserting them into the housings. The housings are ordinarily made of Bakelite by a production molding process which leaves a web in the bore. This is broached out in the machine prior to insertion of the contact elements. After the contact elements have been inserted into the housings so as to form connectors, the machine double checks the seating of the elements by inserting a ram in the connector to move elements on to their keys in the housing. After this the machine performs an inspection operation of the seating of the elements, and, if the assembly is improper, the faulty connector is automatically ejected and segregated from the good ones.

Air pressure and gravity are used to energize much of the movement of the housings and contact elements through the machine, but precision is obtained in the critical movements thereof as well as in the movement of the various tools employed by positive connections with a common drive shaft. Considering its capacity and the number of operations performed, the size of the machine is remarkably small and its structure very efficient.

The invention has a number of features and objects which will become apparent upon consideration of the accompanying drawings, in which:

Fig. 2 is an axial section through a connector that may be assembled by the machine of this invention;

Fig. 3 is a plan view of the cut-off mechanism as taken along the line 3—3 of Fig. 1;

Fig. 4 is a vertical cross section through the cut-off mechanism taken on line 4—4 of Fig. 1;

Fig. 5 is a vertical section taken on line 5—5 of Fig. 1;

Fig. 6 is an enlarged view of a finger for contacting the strip of contact elements being fed into the machine;

Fig. 7 is plan view of a part of a strip of contact elements;

Fig. 8 is a horizontal cross section taken on line 8—8 of Fig. 1 showing a plan view of the stripper plate;

Fig. 9 is a horizontal section taken on line 9—9 of Fig. 1;

Fig. 10 is an elevation taken along the line 10 of Fig. 1 and shows the cut-off mechanism;

Fig. 11 is a vertical section taken along line 11—11 of Fig. 1 showing the carriage for the strip-feeding fingers;

Fig. 12 is a plan view taken on line 12—12 of Fig. 1 showing the mechanism for inserting contact elements into the housings;

Fig. 13 is a perspective view with parts broken away of an insulator housing;

Fig. 14 is a diagrammatic elevation of the feed mechanism for the insulator housings;

Fig. 15 is a plan view taken along line 15 of Fig. 14;

Fig. 16 is a cross section of the insulator housing feed chute taken on line 16—16 of Fig. 15;

Fig. 17 is a vertical cross section taken on line 17—17 of Fig. 1 showing the actuating mechanism for the cut-off press;

Fig. 18 is a vertical section taken on line 18—18 of Fig. 1 showing the index mechanism for moving the insulator housing feed dial;

Fig. 19 is an elevation taken from the left of Fig. 1 showing the brake mechanism for the feed dial shaft;

Fig. 20 is a vertical section taken along line 20—20 of Fig. 1, showing the transfer slide in lowered position, as well as the broach, assembly mandrels, and checking plunger;

Fig. 21 is a vertical section taken on line 21—21 of Fig. 1 showing the actuating mechanism for the transfer slide;

Fig. 22 is a horizontal cross section taken along the line 22—22 of Fig. 20 and shows the assembly mandrels and the broaching elements;

Fig. 23 is a cross section through the assembly mandrels taken on line 23—23 of Fig. 22;

Fig. 24 is a section taken on line 24—24 of Fig. 22 to show the web removing broaches;

Fig. 24a is a cross section taken on line 24a—24a of Fig. 22 showing how the broaches are mounted in the horizontal slide;

Fig. 25 is a side elevation of the machine with mechanical inspection equipment attached thereto;

Fig. 26 is a view taken mostly on line 26—26 of Fig. 25 but also showing a section through the feed dial to reveal how air enters to blow out improperly assembled connectors;

Fig. 27 is a vertical view taken along the line 27—27 of Fig. 26;

Figure 1:
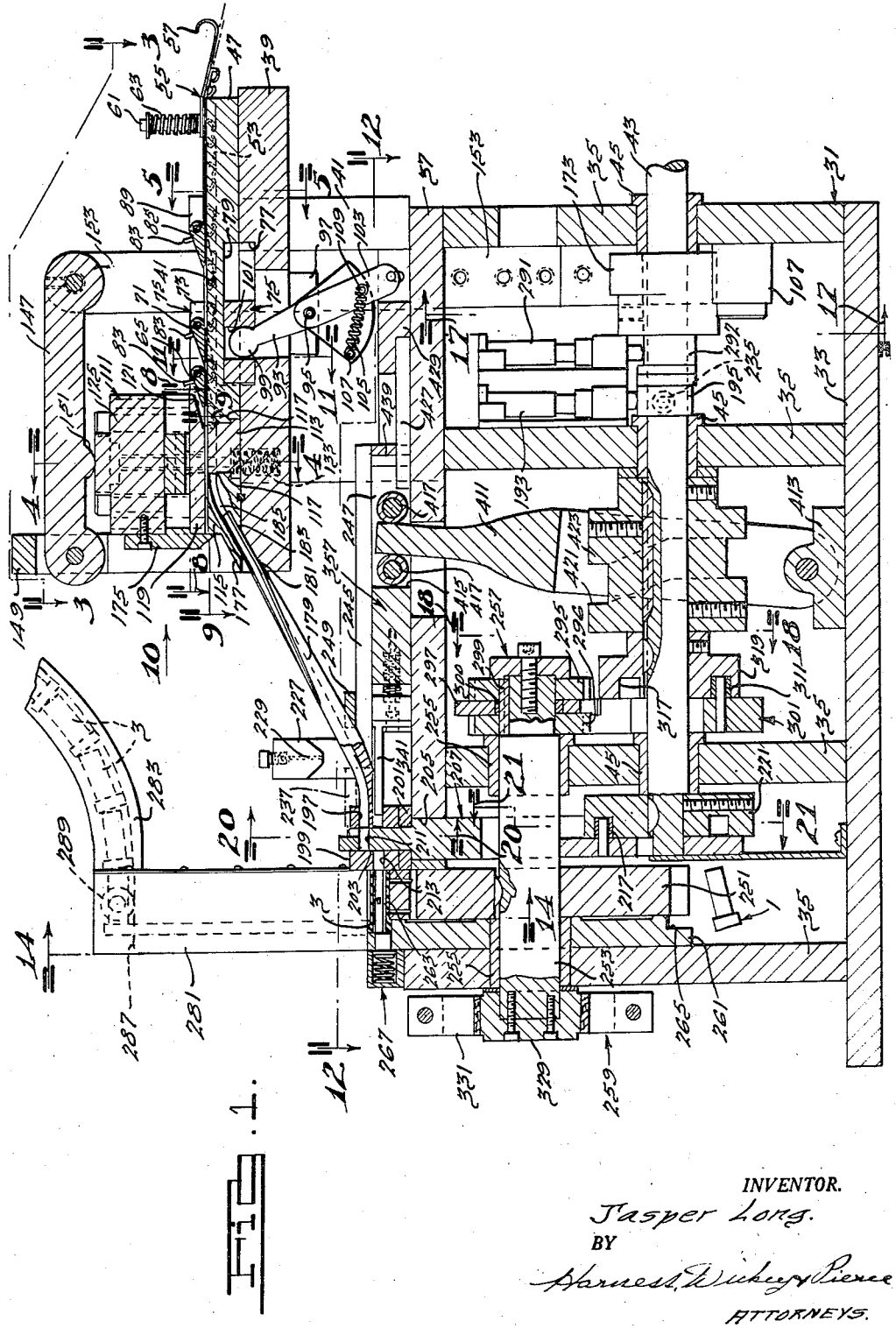
Figure 1 is a vertical longitudinal section with parts broken away through the machine of this invention.

As best realized from Figs. 2, 7, and 13, an electrical connector 1 of the type disclosed and claimed in the copending application of the present inventor entitled "Electrical Connector," filed September 2, 1949, Serial No. 113,833, has been selected to illustrate how the present invention may be employed to assemble electrical connectors. The connector 1 comprises a hollow housing 3 of insulative material, such as Bakelite. The housing 3 has an enlarged end 5 and a non-circular bore 7 that has transverse shoulder providing ribs 9 formed on opposite sides thereof in a central portion of the housing. In the connector illustrated, a pair of contact elements 11 adapted to interconnect two spade type terminals are seated on the ribs 9. The elements 11 are formed of copper or other current conducting material and have a back portion 13 with rebent ends 15 extending beneath the back portion. The back portions have ears 17 struck therefrom to abut the shoulders on ribs 9 while the central portions of the backs 13 are bent to extend around the ribs as shown at 19. The legs or ends 15 of the opposite elements provide axially spaced resilient jaws to grip terminals (not shown) that are inserted therebetween.

The contact elements 11 are formed originally two abreast in strips or ribbons of metal as indicated in Fig. 7. Each of the elements are interconnected by the longitudinal web 21 which constitutes scrap and must be severed from the elements before they can be inserted in the housing 3. The housings 3, if made of Bakelite, are molded and may have a radial fin or flash between ribs 9 which should be removed before the elements are inserted.

In the present machine, the strip of elements 11 interconnected by web 21 is fed into one part and the insulator housings 3 into another. The machine separates the elements 11 from the web 21 and removes the flash from the housings 3. It then automatically inserts a pair of elements 11 into position in each housing 3 on the ribs 9. After that, the assembled connector is mechanically inspected and defective units are automatically ejected.

The present machine has a frame 31 which comprises a base plate 33 that may rest on the floor and a series of longitudinally spaced upright plates 35 that are supported upon the base plate 33 and which, on their upper edges, carry and support the table plate 37. A second table plate 39 is supported at one end of the machine upon vertical plates 41 that are suitably secured to the table 37. The space between the base plate 33 and the table 37 may be used to house the actuating and control mechanism for the various moving parts of the machine. This mechanism may be driven by a rotary shaft 43, empowered by means not shown, that is journaled in suitable bushings 45 in the upright plates 35.

Feeding the contact elements to the machine

The table plate 39 supports a cut-off die structure and a feed construction for delivering contact elements in the strip form of Fig. 7 to the die structure for the cut-off operation. The web 21 between the pairs of contact elements is placed on a guide blade 47 which extends longitudinally of the machine and which is supported upon the surface of the plate 39. The rebent ends 15 of the contact elements extend downwardly and the vertical side faces of the guide blade may be inwardly recessed as shown at 49 to accommodate the inward flare on the ends 15 of contact elements. The guide blade 47 is held in upright position by guide bars 51 which engage the vertical side faces thereof, as best shown in Figs. 5 and 11. The guide bars 51 are suitably secured to the surface of the table plate 39 and are cut out or recessed on their inner and upper corners so that each provides a surface 53 that is spaced beneath the top surface of the guide blade 47 by a distance which is at least equal to the thickness of the contact elements 11. Thus, when the strip of contact elements is moved into the machine, the web rests on the top surface of the guide blade 47 while the rebent ends slide on or only slightly above the surfaces 53. The strips of contact elements are fed into the machine from the right-hand side of the mechanism, as illustrated in Fig. 1, and are yieldably held on the top surface of the guide blade 47 by a hold-down plate 55 of spring steel which is provided with a hook 57 at its outer end whereby it may be readily grasped by hand and lifted to relieve pressure on the strip of contact elements. The hold-down plate 55 has side arms 59 (Fig. 3) that are suitably apertured to allow passage therethrough of the vertical studs 61 which thread into the top surfaces of the guide bars 51. Compression springs 63 are placed between the upper surfaces of the side arms 59 and the heads of the studs 61 to yieldably press the hold-down plate 55 against the surfaces of the guide bars 51.

The strip of contact elements is moved inwardly by fingers 65 (Figs. 1, 6, and 11) which engage the outermost ends 15 of pairs of contact elements 11 on the strip and push them toward the cut-off die structure. The fingers 65 are cut out in a central portion 67 so that they fit over the guide blade 47. The inner ends 69 of the fingers 65 (see finger 85 in Fig. 6) are adapted to extend downwardly over the surfaces 53 of the guide bars whereby they may engage the ends of the contact elements. The outer ends of the fingers are pivoted on a horizontal axis at 71 to the upright side walls 73 of the carriage 75 which is reciprocated longitudinally of the table plate 39. The carriage 75 slides in a recess 77 that is formed in the table plate 39 and in suitable cutouts 79 that are formed in the guide bars 51 and the guide blade 47. The side walls 73 of the carriage extend upwardly through suitable vertical slots 81 in guide bars 51. It is apparent from Fig. 1 that when the carriage 75 is moved to the left, the inner ends 69 of the fingers 65 will, by virtue of their engagement with the ends of the contact elements, push a strip of contact elements inwardly toward the cut-off die structure. On the other hand, when the carriage 75 is moved to the right, the inner ends 69 of the fingers will ride up and over the surface of the contact elements due to the permissible pivoting on axis 71. The fingers 65 therefore act in ratchet fashion to move the strip in only one direction. Since the center of gravity of the fingers 65 is located inwardly or forwardly of their pivot axes 71, the natural position of the fingers is that wherein the inner ends 69 are moved as far as permissible toward the surfaces 53 of the guide bars 51. Handles 83 are provided on the upper surfaces of the fingers 65 so that they may be pivoted upwardly from this natural position, if desired.

A stationary check finger 85 (Figs. 1 and 6), which may be of identical construction with the fingers 65, is pivoted on an axis 87 to mounting blocks 89 that are fixedly secured to the tops of the guide bars 51. Since this finger is, in its natural position, pivoted downwardly, it will engage the outer ends of contact elements to positively prevent them from being moved outwardly out of machine. The check finger 85 may also have a handle 91 so that it may be readily lifted from engagement with the contact elements.

The carriage 75 is reciprocated by a lever 93 which is pivoted at 95 to a block 97 that is secured to the underside of the table plate 39 and has a rounded head 99 that works in a recess 101 of the carriage 75. The lever 93 is driven by a link 103 which, in turn, is driven by a slide mechanism that reciprocates on the table 37 and which will be described in detail hereinafter in connection with the mechanism for assembling the contact elements 11 in the housings 3. The link 103 is pivoted also on the axis 95 to the block 97. It drives the lever 93 through a coil spring 105 that is anchored at one end on a pin 107 that extends from lever 93 and that is anchored at its other end on a pin 109 that extends from a link 103. The resistance of the spring is greater than that of the strip of contact elements to movement so that there is effective force transmittal beween he link and lever. It functions to absorb a difference in stroke between the slide mechanism which moves the link 103 and the slide or carriage 75, it being evident from Fig. 1 that the ends of the recess 77 in the table plate define the stroke of the carriage 75.

*Separating the contact elements*

The fingers 65 move the strip of contact elements into the cut-off die construction 111. The strip is supported in the cut-off die construction by a guide and support blade 113 which is of the same cross section as the blade 47 and which forms an extension thereof. The strip is also supported in the cut-off die by an additional guide blade 115 which is an extension of the guide blade 113, but inasmuch as the contact elements are separated from the strip or web that interconnects them, the cross section of all or some of the outermost portion of the blade 115 may be rectangular rather than recessed as at 49 in the case of the blades 47 and 113. The blades 47, 113, and 115 form a flat horizontal surface that extends across the table 39 and out of the cut-off die 111. This surface, as already indicated, supports the web 21 interconnecting the contact elements. The guide blade 113, as will presently appear, is located beneath the punch of the cut-off die so that it is subject to wear. In order to facilitate its replacement and increase its life, it is arranged so that it may be turned end for end so that the maximum wear resistance of the blade is doubled. This blade has toes 117 which fit in suitable cutouts on the ends of the blades 47 and 115. The blades 47 and 115 may be removably secured to the table 39 by screws (not shown). When so secured, they hold the blade 113 in place and the toes 117 prevent upward movement of the blade. When it is desired to change the blade 113 end for end or to remove it and replace it with another, the end blade 115 may be removed and the necessary operation performed.

The top surfaces of the guide bars 51 are spaced above the surface formed by the guide blades 47, 113, and 115 by a distance substantially the same as the thickness of the strip from the bottom of the web 21 to the topmost face of the back portions 13 and contact elements 11. A flat stripper plate 119 (Figs. 1, 4, and 8) is secured by suitable screws to the inner ends of the top surfaces of the guide bars 51 and to die sections 120 which are extensions of the guide bars 51 and it forms a part of the cut-off die 111. It provides a stripper surface spaced slightly above surface provided by the guide blades 113 and 115. The outer end of the stripper plate may be tapered, as shown at 121, to facilitate entry of the strip of contact elements into the die and to accommodate the fingers 65. Gibs 123 are mounted on top of the stripper plate 119 and secured to the guide bars 51 and die sections by screws extending through the plate. The gibs 123 serve as side supports for the slide 125. The gibs 123 have ways or grooves 127 formed on the inner faces thereof which receive outwardly extending ribs on the slide 125. They therefore serve to longitudinally position the slide. The slide has upwardly facing shoulders 129 formed thereon which abut stops 131 that are screwed to the top of the gibs 123 whereby the upward movement of the slide is regulated. The slide is biased to an upward position against or adjacent the stops 131 by compression springs 133 that fit in suitable apertures 135 in the table 39 and press upon the enlarged heads of pins 137 which extend upwardly through apertures 139 in the guide bars 51 and stripper plate 119 to engage the bottom of the slide 125.

A punch 141 is secured by suitable screws to the bottom of the slide 125. The punch has two parallel and downwardly extending cutting portions 143 which pass through apertures 145 of substantially the same cross sections that are formed in the stripper plate 119. The inside edges of the cutting portions 143 are spaced apart by substantially the width of the top surface of blade 113 or the width of the web which interconnects the contact elements. Thus, when the slide and punch are forced downwardly, the inner edges of the cutting portions 143 act with the outer edges of the blade 113 to shear the contact elements from the web. The web thus remains integral but the contact elements are freed and therefore drop to the surfaces 53 on the guide bars 51 from whence they are forced to the assembly location as will be presently described.

As already indicated, the slide 125 is biased to an upward position by springs 133. It is moved downwardly to sever the contact elements from the strip by mechanism that is driven by the shaft 43 as shown in Figs. 1, 3, 4, and 17. This includes a lever 147 that is pivoted at one end to the bridge 149 that is secured to the inner end of the surface of plate 39. The lever 147 has a rounded projection 151 that engages the top of the slide 125. The other end of the lever is pivoted to a connecting rod 153 that slides vertically in a suitable slot 155 in the table plate 39 and 37. The connecting rod may be formed in three sections so that it can be readily adjusted in length to vary the stroke of the punch 141. The lower section 157 of the rod is connected to the upper section 159 by a link piece 161. The link piece may be screwed to the upper and lower connecting rod sections, one of which is provided with several holes 163 so that length adjustments can be readily made. The lower section 157 has an aperture 165 which receives the end of a rocker arm 167. The rocker arm 167 is pivoted at 169 to the vertical plate 35 and carries a roller 171. A cam 173 that is secured to the shaft 43 engages the roller 171 so that the distance of the roller from the axis of the shaft 43 is dependent upon the angular position of the shaft. The distance, of course, controls, through the connecting rod 153, the position of the parting punch 141 so that the cut-off operation takes place at a predetermined interval in the cycle of rotation of the shaft 43.

After the contact elements have been separated from the original strip, the web 21 from which they have been severed constitutes scrap that is to be ejected from the machine. Since the web 21 is integral, further indexing thereof by the fingers 65 forces it to continue inwardly through the cut-off die construction 111. In this movement, it slides on the top surfaces of the plates 113 and 115 and eventually passes out through the innermost vertical face of the die construction in the space between the bottom of the stripper plate 119 and the top surface of the blade 115. It is evident that after continued operation of the machine, the web so discharged from the cut-off die 111 would become of such length that it would be difficult to handle with facility. Accordingly, the invention provides a cut-off blade 175 (Figs. 1 and 8–10) which cuts up the web into short lengths that may be readily disposed of. The cut-off blade 175 is screwed to the inner vertical face of the slide 125 so that it moves vertically under the influence of the springs 133 and the connecting rod 153. In downward movement, it passes across the opening between the stripper plate and the blade 115 to sever the web section extending therethrough. The die sections 120 and the blade 115 are provided with downwardly tapered surfaces 177 so that the severed pieces slide away from the die constructions 111 into a suitable container or chute (not shown).

Feeding the separated contact elements to the assembly location

After being severed by the punch 141, the contact elements rest on the surfaces 53 of the guide bars 51 beneath the openings 145 in the stripper plate 119. They, of course, must be moved from this position before the succeeding pair of contact elements are severed by the punch, i. e., before another cycle of rotation of the shaft 43. The contact elements are to be moved to a position near the surface of the lower table 37 which they reach through chutes 179. A chute 179 is provided for each of the two contact elements and they are twisted through an angle of 90° so that while they receive the contact elements 11 when the rebent ends 15 are horizontal, they deliver the elements with ends vertical and facing each other, i. e., in the position that they occupy within the insulator housing 3. The upper ends of the chutes 179 are supported by inclined portions 181 that are cut out of the inner end of the table 39 and the extremities of the chutes are supported in apertures 183 in the die sections 120 that are secured on opposite sides of the blade 115. The apertures 183 in the die sections 120 may be formed to open into the inner vertical faces thereof so that the die sections can be removed by a horizontal movement outwardly from the blade 115. The die sections 120 are provided with passages 185 that connect the surfaces 53 on the guide bars 51 with the ends of the chutes so that the severed contact elements may reach the chutes after the parting operation.

Air jets force severed contact elements through the passages 185 and the chutes 179. The air jets are intermittently operated by the shaft 43 so that they are on at the proper period in the cycle of operation. The air jets issue from downwardly and inwardly inclined passages 187 in the stripper plate 119 which open into the bottom thereof adjacent the outermost or right-hand vertical faces of the apertures 145 in which the punch operates the passages 188 in the punch portions 143 forming extensions of passages 187. The air jets are thus directed upon the rear of contact elements which have been severed by the punch and blow these elements from the guide bar surfaces 53 into the passages 185 and then down the chutes 179. The air jet passages 187 receive air from a mainfold passage 189 that extends transversely of the stripper plate and opens out of a vertical edge thereof and which is adapted to receive suitable conduit 191. The passages of air through the conduit 191 and into the air jet passages 187 is controlled by a plunger valve 193 of conventional construction. The stem of the plunger valve bears upon a cam 195 that is secured to the shaft 43. It is therefore evident that opening of the plunger valve to permit air flow through passages 187 is synchronized with the cut-off operation since both are regulated by rotary cams secured on shaft 43.

The lower or delivery ends of the chutes 179 fit in recesses 197 that are formed in the vertical face of one side of a block 199 (Figs. 1 and 20) that is supported on a spacer plate 201 at the end of the lower table 37. The ends of the chutes 179 open into a vertically extending aperture 203 in the block 199 and plate 201, this aperture communicating with an enlarged aperture 205 which extends through the plate 37. The apertures 203 and 205 may be rectangular and slidably support a transfer slide 207 (Figs. 1, 20, and 21) which serves to carry the contact elements 11 from the chutes 179 to a position from which they can be pushed into the insulator housings 3. The transfer slide 207 is moved vertically by the shaft 43 at predetermined intervals in the cycle of rotation of the shaft. Slide 207 consists of a top portion 209 that fits in the aperture 203 and which has a transverse aperture 211 that is adapted upon alignment with recesses 197 to receive contact elements from the chutes 179 and upon movement downwardly to communicate with a transverse aperture 213 in the block 199 through which the contact elements may be pushed into the insulator housings. The top part 209 of the slide is fitted into a lower portion 215 that may be built up from side straps and suitable cross bracing members. The lower part 215 of the slide contains a transversely extending roller 217 which fits in a cam recess 219 in the cam body 221 that is keyed to the shaft 43 near the end thereof. If desired, the inner end of the shaft 43 may extend within the slide portion 215 and be confined between two vertical bearing plates 223. By this construction, the slide 207 can move vertically over the shaft 43 and engagement of the shaft with the bearing plates prevents sidewise movement of the slide. Similarly, the lower part 215 of the slide may be provided with vertical bearing plates 225 for a shaft which extends therethrough. It is evident that upon rotation of shaft 43, the cam 221 acting through roller 217 will force the slide to move up and down in the recess 203 so that the opening 211 in the slide is moved from an extreme upper position wherein it is aligned with the chutes 197 to an extreme lower position wherein it is aligned with the aperture 213 in the block 199. The slide thus acts as an elevator to automatically transfer the contact elements from the chutes 179 to a position in alignment with aperture 213.

As already indicated, the contact elements 11 slide down the chutes 179 partly under the influence of gravity and partly under the influence of the forces provided by air from the jet passages 187. In order to insure movement of the elements 11 from the chutes into the aperture 211 in the transfer slide 207, two additional jets, one for each chute, are provided adjacent the lower ends of the chutes in a bridge member 227. The air jets are expelled from a pair of vertical passages 229 that are fed by a transverse manifold passage 231 in the bridge. The manifold passage receives air from a conduit 233 that is under the control of a plunger valve 235 that is operated by cam 195 on shaft 43 (Fig. 1).

In order to prevent interlocking or jamming of the contact elements under the influence of the air jets, a divider plate 237 is provided which keeps the elements separated after they are in the transverse aperture 211 of the slide 207. The plate 237, which is of similar construction on each end so that it may be turned end for end and continued in use after one end has been worn to an excessive degree, fits in vertical slots 239 and 241 in the block 199 and transfer slide 207 which extend downwardly to a plane slightly above the aperture 213 in the block. This serves to keep the elements separated until they are out of the effective range of the air jets. If necessary, pressure within the slide aperture 211 may be relieved by a slot or aperture (not shown) in the block 199 located just above the aperture 213.

In addition to the support furnished to the chutes 179 by the block 199, the chutes may be supported on a cover 245 that is supported on side rails 247 on the surface of the table 37 and by a block 249 secured to the top of the cover 245.

Feeding the insulator housings to the assembly location

The insulator housings 3 must, of course, have their bores 7 aligned with the aperture 213 in the block 199 in order that the contact elements 11 may be inserted therein at assembly. The insulator housings are supported in such a position and moved to and from this position by means of a rotary feed dial 251 which may be enclosed by a cover 252 (Fig. 12). The feed dial is keyed to the shaft 253 that is supported by bushings 255 in the upright walls 35. The shaft 253 has an indexing mechanism 257, to be later described, and a brake mechanism 259 attached to its left-hand end. It extends through the bearing plates 225 (Fig. 21) in the transfer slide 207, as already described, and through a backing plate 261 that is secured to the face of the endmost upright 35 so that it forms a bearing support for the radial face of the feed dial 251. The feed dial 251 has a plurality of circumferentially spaced recesses 263 formed in its periphery which are parallel to the axis of rotation. The dial has a thickness no greater than the length of the reduced diameter portion of the housings 3 so that the enlarged end portions of the housings extend from the radial face of the dial, which is opposite to the block 199, and fit in an annular groove 265 in the face of the backing plate 261. A pressure pad 267 (Fig. 12) may be provided in the upright 35 in the backing plate 261 to urge the insulator housings into contact with the block 199 and thus compensate for variations in the length such as may occur in the mass manufacture of the housings.

The pressure pad 267 may include a slide 271 that fits in a suitable aperture in the plate 261 and which has the end remote thereof which is from the dial engaged by a coil spring 273 that is backed up by the member 275 which is secured to the face of the plate 261. The face 277 of the slide 271 which engages the housings is tapered and the stroke of the slide is limited by a shoulder 279 so that the housings ride up the tapered surfaces of the slide and are subjected to gradually increasing pressure which forces them against the block 199.

While the insulator housings may be fed by hand directly to the feed dial 251, a feed chute is preferably employed and this, though it may likewise be fed by hand, is preferably hopper fed as illustrated in Figs. 1, and 13–16. The insulator housings reach the feed dial 251 through a downwardly inclined chute 281 which is radial with respect to the dial. The outlet of the chute is located so that insulator housings enter the second recess 263 from the topmost recess which is in alignment with the assembly aperture 213. As will be later described, the insulator housing in the intermediate recess, that is the one adjacent to the recess aligned with aperture 213, is subjected to a definning or flash removing operation. The chute 281, which may be built up from flat sections, has a cross section (Fig. 16) which is similar in shape to that of a longitudinal section through the housings so that the latter may only slide sideways down the chute with the enlarged head on the proper side of the feed dial. A slide 283 may be arranged transversely of the chute 281 to connect it with the hopper 285. The hopper is of a type that may be purchased on the open market and receives the housings in bulk and delivers them one at a time with the enlarged end first to the slide 283. The housings so delivered slide longitudinally downwardly to a landing 287 at the inlet of the chute 281. Each housing is pushed into the chute from the landing by an air actuated plunger 289 which receives air from line 290 that is controlled by air valve 291 (Fig. 1) which is operated by cam 292 on shaft 43. The top surface of the inlet end of the chute 281 is leveled as shown at 293 so that in the event the enlarged head of a housing 3 is at the wrong end, the pressure applied to the insulator by the plunger 289 will simply force the insulator to slide off the end of the chute, which it obviously cannot enter, thus preventing a jam at the inlet of the chute 281.

The feed dial carries only insulator housings on one side of the assembly aperture 213 and on the other side it carries the assembled connectors, that is the housings 3 with the contact elements 11 inserted therein. A number of operations are performed on the housings or terminals that are carried in the dial recesses 263, viz: (1) removal of flash or definning of the houses; (2) insertion of the contact elements into the housings; (3) seating of the contact elements in the housing; (4) inspection of one end of the terminal; and (5) inspection of the other end of the terminal. Each of these operations takes place at a different location or station and requires the feed dial to be stationary during its execution. It is therefore necessary to index the feed dial from one station to the next, and this is accomplished by the index mechanism 257 which operates in conjunction with the brake mechanism 259.

The index mechanism 257 (Figs. 1 and 18) is actuated by the drive shaft 43 at a predetermined interval in the shaft's cycle of rotation so that it is synchronized with other operations taking place in the machine. This mechanism includes two circular ratchets 295 and 296, which are oppositely directed, and a pawl plate 297 in between. The ratchets are keyed to the feed dial shaft by the key 299, but the pawl plate rotates on the shaft on a sleeve bushing 300. The pawl plate and ratchets are driven by a lever and cam follower 301 which is pivoted at 303 to the adjacent upright 35. The lever 301 has an upwardly extending arm 305 which is provided at its end with a projection 307 that engages the radial surfaces of the ratchet teeth on pawl plate 296. The lever 301 also has an arcuate arm 309 which extends transversely of the arm 305 and which is provided at an intermediate point with a roller 311. The end of the arm 309 is connected by an adjustable link 313 to a radial projection 315 on the pawl plate 297. The roller 311 rides in a cam recess 317 in the cam body 319. The cam body is keyed to shaft 43. Upon rotation of the shaft and cam body 319, the edges of the recess 317 force the roller to move radially with respect to the axis of shaft 43. This rocks the lever 301 about its pivot 303, which movement is transmitted through the link 313 to the pawl plate 297. The plate 297 has a plurality of pawls 321 pinned thereon and adapted to engage the radial surfaces of the pawl teeth on ratchet plate 295. The pawls are urged into engagement with the ratchet teeth by spring strips 323 which are pivoted to the plate at one end, as shown at 325, and held in stressed condition upon the outermost surface of the pawls by restraining pins 327 which limit the outward pivotal movement.

In operation of the index mechanism 357, the projection 307 on the lever arm 305 engages teeth on the ratchet 296 when the cam has forced the roller 311 to a position of maximum radius, i. e., when the lever 301 is in its most counterclockwise position, as viewed in Fig. 18. The engagement of the projection 307 with the ratchet teeth prevents rotation of the feed dial 251. As the lever 301 is pivoted clockwise due to the cam recess forcing the roller inwardly with respect to the axis of the shaft 43, the projection 307 is moved away from the ratchet teeth. At the same time, the link 313 is moved upwardly to pivot pawl plate 297 in a clockwise direction. This forces the pawls to slide up the inclined edges of the ratchet teeth and, at a position of minimum cam recess radius, they fall into engagement with the radial faces of the teeth.

During the movement of the pawls 321 relative to the ratchet 295, creeping of the feed dial is prevented by the brake mechanism 259. This comprises a cap 329 that is secured to the end of the feed dial shaft 251 which extends out of the inmost upright plate 35 and a clamp 331 that is secured by a suitable screw 333 to the upright 35. The clamp, which is split so that its diameter may be adjusted by the screws 335, has brake linings 337 provided on its inner surfaces which embrace the cap 329. The pressure of the brake lining on the cap, and thus, the frictional resistance of the brake mechanism 259 to rotation of the dial shaft 251, may be regulated by means of the screws 335.

As the roller 311 is forced outwardly with respect to the axis of the shaft 43 by the cam recess 317, the link 313 is moved downwardly and the pawl plate and pawls 321 are moved in a counterclockwise direction. During the initial stage of this movement, the projection 307 on arm 305 is out of contact with the teeth on ratchet 295. Hence, during this initial stage, the pawls 321 act through the ratchet 295 to rotate the feed dial against the resistance of the brake mechanism 257. However, when the roller reaches a position of maximum radius, the projection 307 is in engagement with the teeth on ratchet 296 so that rotation is positively stopped by the arm 305, and the positions of the recesses 263 on the feed dial are accurately defined.

*Removing flash from the housings and inserting the contact elements into the housings*

As indicated hereinbefore, the insulator housings 3 have flashed removed from the bore thereof at the index station immediately prior to the station which is in alignment with the assembly aperture 213. The contact elements are pushed into the housing which is located in alignment with the aperture 213. At the station immediately after the recess 213 which is in alignment with the aperture 213, a seating operation is performed to insure that the contact elements are pushed far enough into the housings to be seated on the keys 9. The three operations of flash removed, inserting the contact elements, and seating the contact elements, take place simultaneously at these three successive stations, that is while the insulator housings are located in the three topmost peripheral recesses 263 of the feed dial 251. Each of these operations is performed by plungers that pass through the block 199, and all of the plungers are preferably driven by a common slide mechanism that is actuated by the drive shaft 43. This slide is preferably connected to the feed fingers 65 so that it also moves them and actuates feed of the contact element strip into the machine.

Referring first to the insertion of the contact elements in a housing that is aligned with the aperture 213 in block 199, it will be recalled that the transfer slide 207 carries contact elements 11 from the chutes 179 into alignment with the aperture 213. The contact elements rest on their side edges with their rebent ends 15 confronting so that they are in the same relative positions that they are to occupy within a housing 3. Thus, longitudinal translation of each of the elements is required to force them through aperture 213 into a bore of the housing. This movement of the contact elements is effected by a pair of mandrels 339 and 341 (Figs. 12, 20, 22, and 23) which are of identical construction, one being provided to engage the end of each of the contact elements. The mandrels 339 and 341 extend through an aperture 343 in the block 199 which is in longitudinal alignment with the aperture 213 and thus with the bore 7 of the housing 3 in the topmost station. In the cross section, the mandrels are preferably trapezoidal to conform with the general shape of the ends of the contact elements 11. The confronting faces of the mandrels have recesses 345 therein that contain a flat spring 347 that urges the mandrels apart, this, of course, being resisted by the walls of the aperture 343 as well as the walls of the aperture 211 in the transfer slide 207 and the walls of the assembly aperture 213 in the block 199. The ends of the mandrels remote from the contact elements have heads 349 formed thereon which fit in vertical slots 351 that are formed in the confronting faces of adapter blocks 353 and 354 for the mandrels 339 and 341, respectively. The shank portions of the mandrels extend through suitable slots 355 that communicate with the vertical slots 351. The adapter blocks 353 and 354 are connected to the slide 357 for movement therewith. The slide is preferably flat and reciprocates on the surface of table 37. The blocks 353 and 354 fit in a cutout 359 that is formed in the end of the slide which faces the block 199. The confronting vertical faces of the blocks slidably engage each other, and the outer vertical faces engage the walls of the cutout 359. This alignment permits yieldable and relative movement of the mandrels as will presently appear. The blocks 353 and 354 each have longitudinal apertures 361 therethrough which may be provided with oppositely directed shoulders 363 and 365. The slide 357 is provided with apertures 367 that are in alignment with the block apertures 361. The ends of the apertures 367 are reduced in diameter to provide shoulders 369 and threaded as shown at 371. Coil springs 373 are confined between the shoulders 363 in the blocks 353 and 354 and the shoulders 369 in the slide apertures 367. The coil springs urge the blocks away from the slide and toward the block 199. This movement is limited by studs 375 which thread into the apertures 371 at the end of slide apertures 367 and which bear upon the shoulders 365 in the blocks. It is evident that should either mandrel encounter an obstacle that the resistance of its spring 373 will be overcome to permit relative movement of the block and slide. The blocks 353 and 354 are preferably staggered, as indicated in the drawing, this being readily accomplished by placing one of the shoulders 369 in a deeper part of its aperture 367. When the mandrels are staggered in this way, the contact element which is engaged by the forward mandrel 339, snaps into place in the housing 3 before the other contact element. Inasmuch as some inward deflection or bending or sidewise movement of the rebent ends of the contact elements is required to enable them to ride up over the keys 9 in the housings 3, the staggered arrangement and independent seating gives maximum freedom of movement of the contact elements 11 within the housings. It will be observed that the aperture 213 is tapered to a reduced size outlet so as to facilitate entry of and seating of the elements 11 in the housings.

The insulator housings 3 are ordinarily formed of plastic by use of suitable molding equipment, and this generally results in the formation of a thin web or flash extending across the bore 7 of the housing in the plane of the keys 9. When it is not possible to exert uniform control over the molding of the insulator housings in order to insure that the thickness of the flash or web is consistently thin, it is desirable, as a precautionary measure, to remove the flash prior to insertion of the contact elements so as to avoid the possibility of jamming in case the contact elements are unable to break through the flash. In the present machine, this is done by means of a broach 377 (Figs. 12 and 23) that is mounted upon and driven by the slide 357. The broach 377 comprises a pair of flat strips 379 which have pointed ends 381. The strips are preferably separated by a shim 383 so that the pointed ends have a certain amount of flexibility relative to each other. The ends of the strips 379 remote from the pointed ends are interconnected by a clamp bushing 385 which comprises a cylindrical member that has a rectangular inner aperture which conforms to the shape of the superposed strips 379 and which is split along the extensions of opposite faces of the aperture. A pin extends radially through the bushing to hold the assembly together. The clamp bushing fits in a cylindrical aperture 387 that opens out the end of the slide 357. A radial set screw 389 in the slide bears upon the outer surface of the bushing 385 to hold it in the aperture 387.

Since the recesses 263 in the feed dial are spaced equal radial distances from the axis of the dial shaft, it is evident that the insulator housing, which is to be broached for flash removal, is at a slightly lower level or slightly closer to the table 37 and slide 357 than the housing at the station which is in alignment with the aperture 213 of the block 199. Thus, the aperture 387 in the slide is located below and to one side of the apertures 367 that are provided for the mandrel assemblies. The broach 377 extends through a suitable aperture 391 that is formed in the block 199 and which is in alignment with a housing as the feed dial is in stationary indexed position.

When the broach 377 is reciprocated by the slide 357 and severs flash within the insulator housing, the residue of the flash constitutes waste material which should be removed before the contact elements are inserted into the housing. This is conveniently accomplished by blowing air through the housing after the flash has been broken up by the broach 377 and the broach withdrawn by slide 357. The air reaches the housing through a transverse aperture 393 in the block 199 that opens into the aperture 391. A conduit 395 is connected to the block 199 to deliver air to the aperture 393. A suitable outlet aperture 397 is formed in the backing plate 261 in alignment with the broach aperture 391 to allow the material to be blown out of the housing by the air flowing through the aperture 393. Air in the conduit 395 is under control of valve 235 (Fig. 1) and synchronized with the other operations in the machine.

In the station immediately beyond the assembly station, a plunger 399 is forced by the slide 357 into the assembled connector 1 to insure that the contact elements are seated on the keys, thus supplementing the action of the mandrels 339 and 341. The plunger 399 is of a shape suitable to that of the bore 7 of the housing and has an enlarged head 401 that slides in an aperture 403 that is formed in the slide 357. A spring 405 is confined between the head 401 and the bottom of the aperture 403 to urge the plunger toward the block 199. The end opening of the aperture 403 is covered by a strip 407 which has a suitable aperture for the shank of the plunger 399. The block 199 also has a suitable aperture 409 for the plunger 399. As in the case of the broach 377, the plunger 399 is located below the assembly mandrels so that it is in proper alignment with the recess 263 on the down feed side of the assembly station.

It may be noted from Fig. 20 that the block 199 is most conveniently formed in sections which are fitted together in assembly. One such segment may be conveniently defined by the axis of apertures 213 and 343 and by the axis of broach aperture 391. The other segment may be bounded on one side by the axes of apertures 213 and 343 and on the other side by the axis of aperture 409. In this way, the various apertures are formed half in one segment and half in another and open out the sides thereof so that they may be conveniently formed by milling or similar operations which readily provide a non-circular shape.

As already indicated, the slide 357, which drives the assembly mandrels 339 and 341, the broach 377, and the seating plunger 399, is itself driven by the drive shaft 43. This is accomplished through the medium of a lever 411 (Figs. 1, 12, and 24) that is pivoted on a transverse axis at its lower end to a bracket 413 which is secured to the base plate 33. The upper end of the lever is received in a recess 415 that is formed in the end of the slide 357 which is remote from the block 199. Rollers 417 are pivoted to the slide on transverse axes and are disposed within the recess 415 on opposite longitudinal sides of the lever and in engagement therewith. The lever has a roller 419 which is fixed to an intermediate portion thereof and which rides in the cam track 421 in the cam body 423 which is keyed to the shaft 43. Rotation of the shaft 43 and the cam body 423, therefore, causes the lever 411 to rock back and forth, and this results in longitudinal reciprocation of the slide 357 on the surface of table 37.

As indicated hereinbefore, the slide 357 moves the carriage 75 which carries feed fingers 65. For this purpose, the slide is provided with transverse recesses 425 that open into the longitudinal lever receiving recess 415. These receive the arms of a T-shaped link bar 427 which is therefore reciprocated with the slide 357. The other end of the link bar 427 is pinned to a slide 429 that rests on the table 37. This slide has a longitudinal slot 431 which receives the end of lever 103 and a transverse slot 433 opening into the slot 431 that receives a transverse pin 435 that is provided in the end of the link 103. Thus, reciprocation of the slide 429 with the slide 357 will carry the pin 435 with it, and thus pivot the lever 103 to reciprocate the carriage 75.

The slides 357 and 429 are confined by suitable side rails. Thus, the longitudinal rails 247 are secured to plate 37 on either side of the slide 357 and engage the side faces thereof. A cross bar 439 extends transversely between the ends of the rails 247 and contains a suitable aperture 441 for the link bar 427. The slide 429 rides between the side rails 443 which extend longitudinally of the machine on either side of the slide and are bolted to the table 37.

Inspecting the assembled connector

In spite of the seating forces provided by the mandrels 339 and 341 and the plunger 399, there is a possibility that the contact elements may not be properly seated on the keys within the housings. The inspection unit 445 (Figs. 25–31) may be attached to the machine of Figs. 1–24 and automatically separates connectors 1 in which the contact elements are not properly seated from the satisfactory connector and discharges them from the machine. The inspection unit has mandrels adapted to engage each end of each contact element. If the contact elements are out of place, the resistance that they impose upon the mandrels serves to operate a valve which controls a pneumatic ejection arrangement that discharges the terminals from the recesses 263 in the feed dial 251.

The inspection unit 445 includes a vertical mounting plate 447 which is located opposite the recesses 263 which are about 90° downward from the assembly station at the top of dial 251. The plate 447 may be mounted on the side faces of the uprights 35 through the medium of longitudinally extending vertically spaced rails 449 which are secured to the uprights and to the plate 447 through the medium of suitable screws. There are two pairs of rails, one pair being located on one side of the feed dial and the other pair on the opposite side.

The facing corners of the rails constituting each pair which are located adjacent the plate 447 are cut out as indicated at 453 to receive flanges on the slides 455. The slides engage the inside surface of the plate 447 and the upper and lower faces are in engagement with the rails 449, the slides being able to move longitudinally relative to the rails and plate but being confined against transverse movement by virtue of the engagement of the flanges in the cut out corners 453. The pairs of rails 447 are located so that the slides 455 mounted therebetween are in alignment with two peripheral recesses 263 in the feed dial 251 when the latter is in stationary position, preferably, the slide adjacent the inside face of the feed dial being uppermost and the other slide on the opposite side of the dial being aligned with the next recess 263. Each slide 455 carries two mandrels 457 which are substantially the same as the mandrels 339 and 341. The mandrels have heads extending at right angles to the shanks which fit in slots 459 of suitable plungers 461 that are mounted in bores 463 in each slide 455. Each plunger is spring pressed outwardly by coil springs 465 that are contained in the bores 463. Outward movement of the plungers is limited by a cover plate 467 that is screwed to the outer face of the slide and which has suitable apertures through which the stems of the mandrels 457 extend. Each mandrel is adapted to contact the end of one contact element, and should the latter be jammed out of place, its particular mandrel will move against the resistance of its spring 465. Each plunger has a transverse pin 471 extending outwardly therefrom through an elongated slot 473 in the wall of the slide 455. The pins 471 also extend through suitable slots 475 that are formed in the plate 447 on opposite sides of the feed dial 251 whereby they operate a pneumatic ejection system to be presently described.

The slides are reciprocated toward and away from the feed dial by the drive shaft 43. This is conveniently accomplished by connecting the slides to the lever 411 which drives the slide 357 as previously described. The right-hand slide 455 is driven from the lever by a link 479 that is pivoted by a pin 481 acting through an integral spacer block 483 to the lever 411. The other end of the link 479 is screwed to the slide by means of a transverse screw 485 which extends through a suitable slot 487 in the plate 447 and is threaded into a suitable aperture in the right-hand slide 455. The left-hand slide 455 has a lever 491 secured thereto through the medium of a pin 493 that is threaded into the slide and extends through a suitable slot 495 in the mounting plate 447. The lever 491 is pivoted at a central point to the plate 447 by means of a pin 497. The lower end of the lever 491 is connected to the lever 411 through the medium of an adjustable connecting link or rod 499 that is pivoted at 500 to the lever 411.

It is evident that as the lever 411 rocks back and forth under the influence of the cam 423 that the slides 455 will reciprocate in the rails 449. During this movement, the feed dial 251 is held stationary by the index mechanism 257 so that the mandrels can enter the lower insulator housing from one end and the upper from the other, the length of the stroke being governed by the connections to the lever 411 so that it does not result in the mandrels exerting any more than a very light pressure on the contact elements if they are properly seated. This pressure, however, is enough to overcome the resistance of the springs 465 so that the pins 471 are moved toward the bottom of the bores 463. In the event that the contact elements are out of place so that they are not contacted by the mandrels, there will, of course, be no pressure on the plungers in opposition to that of the springs 465. In that case, the resistance of the springs on the pins 471 is great enough to enable them to move the control slides 501 of the air valves 503 and 505.

Figure 28:
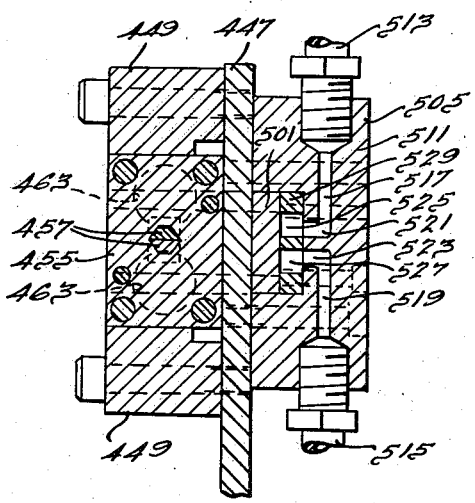
Fig. 28 is a cross section taken on line 28—28 of Fig. 26.
Figure 29:
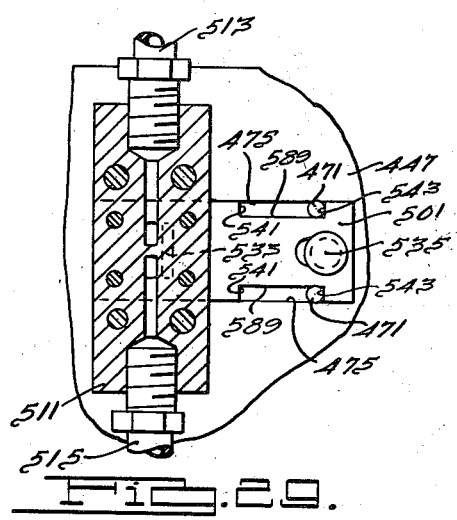
Fig. 29 is a cross section taken on line 29—29 of Fig. 26.
Figure 30:
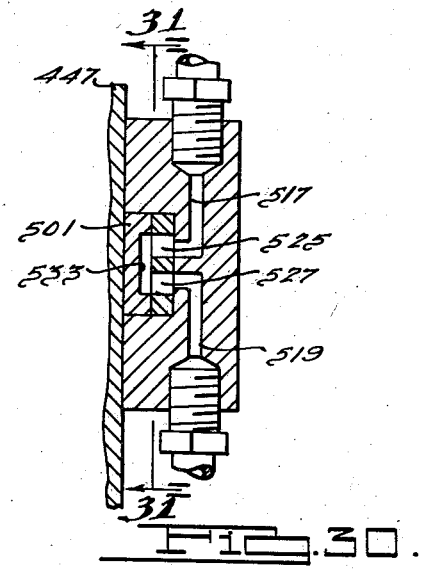
Fig. 30 is a cross section similar to that of Fig. 28 but shows the actuating slide in a different position.
Figure 31:
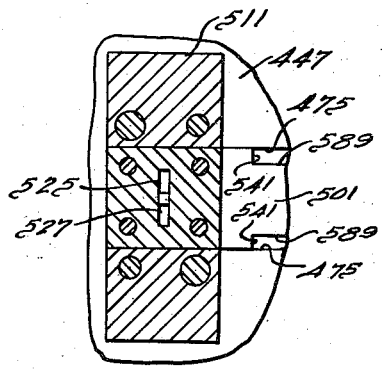
Fig. 31 is a view taken along line 31—31 of Fig. 26 but shows the control slide in operative position.

The air valve 503 is adapted to block or to permit passage of air between the conduits 507 and 509 which enter in opposite sides of the valve body 511 and the air valve 505 is adapted to block or to permit flow of air between the conduits 513 and 515, the conduits 509 and 515 being located on the outlet side of their respective valves. The valve body 511 (Figs. 28–31) for each of the valves 503 and 505 contains longitudinal air passages 517 and 519 that communicate directly with the inlet and outlet conduits. The air passage 517 and 519 do not communicate directly with each other but open into radial passages 521 and 523, respectively, which, in turn, open into apertures 525 and 527 in the plate 529 that is screwed in place in the valve body. The control slide 501 bears upon the plate 529 and also upon the surface of the mounting plate 447. The control slide has an uninterrupted recess 533 which, when aligned with the apertures 525 and 527, permits passage of air from one to the other (Figs. 30 and 31). In this position of the control slide, the air can pass through the valve 503 or 505. However, when the slide 501 is moved longitudinally a small amount, a flat surface of the slide passes beneath the apertures 525 and 527 to block air flow therebetween (Figs. 28 and 29).

The slide 501, as already indicated, is moved by the pins 471 on mandrel plungers 461. Its longitudinal movement is guided by a pin 535 which fits in a slot and threads into the mounting plate 447. The upper and lower edges of the slides 501 have elongated cutouts or recesses 589 which overlie the slots 475 in the plate 447 so that the pins 471 extend transversely into the cutouts whereby they may abut the shoulders 541 and 543 which define the opposite ends of the cutouts. The slides 501 are arranged so that when they are in the retracted or off position and the mandrels 457 are completely withdrawn to their extreme position by the slides 455, the pins 471 engage the remote shoulders 543. The length of the cutouts 589 or the distance between the shoulders 543 and 541 is the same as the length of stroke to be taken before the mandrels contact the ends of properly seated contact elements. Thus, if the contact elements are properly seated, the resistance which they provide to entrance of the mandrels 457 will overcome the resistance of the springs 465 and prevent the pins 471 from exerting pressure on the shoulders 541 which would tend to move the control slides 501 and allow air to flow through the valves 503 or 505. However, if the contact elements are not in place and are not contacted by the mandrels, there will be no resistance to entrance of the mandrels 457, and since the stroke of the slide 455 is greater than the distance between the shoulders 541 and 543, the pins 471 on the mandrel which fails to engage a contact element will be carried forward against the shoulder 541. Since there is substantially no resistance to movement of the slide 501, this will result in a shift in its position so that its recess 533 aligns with the apertures 525 and 527 to allow air flow through the valve. As will be presently indicated, this permits the connector 1 containing the misplaced contact element to be ejected by an air jet through one or the other of the apertures 545 that are provided in the mounting plate 447 adjacent the edge of the feed dial 251. On return movement of the slides 455 and mandrels 457, the pins 471 will engage the shoulders 543 if the slide 501 has been moved to the valve open position and will force the slide to a closed position.

In order to allow the faulty connectors 1 to be ejected by air pressure, each of the peripheral recesses 263 in the feed dial 251 has a pair of radial passages 547 opening into the bottom thereof. Each of these passages is connected to a longitudinal aperture 549 which opens into the radial face of the feed dial that is in engagement with the backing plate 261. When the feed dial is in stationary position, the apertures 549 of the two recesses that contain the contact elements being inspected by the mandrels 457 are in alignment with upper and lower apertures in the backing plate and upright 35. The outlet conduit 509 from the air valve 503 is threaded into the upright in communication with the upper aperture and the outlet conduit 515 of the valve 505 is threaded into the backing plate in communication with the lower aperture. It is thus evident that when either valve 503 or 505 is open, air will flow through either the upper or lower aperture into the proper longitudinal aperture 549 in the feed dial and thence through the radial passages 547 to blow the connector out of the recess and over the machine through the aperture 545 in the plate 447.

In operation, the strip containing the contact elements 11 and the web 21 (Fig. 7) is fed into the machine from suitable reels so that the web 21 rests on the guide blade 47. The strip is moved by the pusher fingers 65 which are mounted on carriage 75. The carriage is drivably connected through links 93 and 103 to the slide 357 which is reciprocated by lever 411, the latter being driven by shaft 43 through the cam 423. During the interval that the fingers 65 are moved outwardly so that they are not operatively engaged with the strip to force it into the machine, the connecting rod 153 of cut-off press 111 is forced downwardly by cam 173 on the shaft 43. The punch 141 (Fig. 4) then severs a pair of contact elements 11 from the strip and they fall through apertures 145 in plate 119 (Fig. 8) into alignment with chute passages 185. At this time the cam 195 on shaft 42 opens the air valve 193 to allow air to flow through conduit 191 and jet passage 187 to blow the elements 11 into chutes 179. During the severing operation, the blade 175 cuts off the strip web 21 which extends out of the press 111 (Fig. 10).

The contact elements slide down chutes 179 into aperture 211 in the transfer slide 207 that is in up position under the influence of the cam 221 on shaft 43. The air valve 235 is operated by cam 195 during this period to allow air jets to issue from passages 229 to blow the elements into the slide 207. Operation of valve 235 also allows air to flow through passages 393 (Fig. 20) to blow flash dust out of the housing 3 that has just been broached by plungers 377.

Continued rotation of shaft 43 causes the slide 207 to move downwardly and the feed dial 251 to index so that the broached housing 3 and the severed elements 11 align with aperture 213 in the block 199. This rotation also causes the slide 357 to move forwardly so that the mandrels 339 and 341 insert elements 11 into the housing 3. Also, the plunger 409 (Fig. 20) enters the last connector assembled to make sure the elements 11 are properly seated and the broaches 377 clean out the housing 3 next in line for assembly.

During forward movement of the slide 357, the carriage 75 is moved to enable fingers 65 to push the strip of elements 11 into the machine. The inspection apparatus 447 is connected to the lever 411 which operates slide 357. It is therefore energized at this time so that the slides 455 each move toward the dial 251 to check their respective connectors 1. In the event that an element 11 is misplaced, the valves 503 or 505 are operated to allow air jets through passages 547 in the dial 251 to blow the faulty connector out of the recess 263 through opening 545 in the plate 447.

The feed dial 251 is indexed by mechanism 257 during the period that the slide 357 is retracted to withdraw the various plungers from the housings and connectors carried by the dial. This movement of the dial allows an assembled connector 1 to drop by gravity out of its recess 263. An insulator 3 it fed into chute 281 during this period by cylinder 289, this operation being initiated by closing of valve 291 by cam 292 on shaft 43. An insulator 3 also slides out the bottom of chute 281 during this period into the dial recess 263 located beneath the chute. The machine is therefore in readiness for continued assembly of connectors 1 from housings 3 and elements 11.

It will be evident that many changes may be made in the structure herein described and illustrated without departing from the spirit and scope of the invention.

What is claimed is:

1. In a machine for separating contact elements having a back portion and rebent end portions from a strip substantially coplanar with the back portions, said elements being two abreast in said strip and separated by a web of strip material, and then inserting a pair of said separated elements consisting of two formerly abreast in the strip into the bore of a housing so that the rebent ends cooperate to form terminal receiving jaws and the back portions engage opposite walls of the bore, the combination of intermittently operated means for severing each of two contact elements that are abreast in the strip from the web thereof, a guide and support means between the elements of said pairs and engageable with the web of the strip for supporting the strip in and prior to its entrance into the severing device, intermittently operated pusher means engageable with the strip on the guide means for moving it thereon into the severing means, intermittently operated means for individually delivering a plurality of housings to a predetermined position and supporting them in such position, means including tracks communicating the separated contact elements in the severing device with the bore of a housing in said predetermined position whereby the elements may move from the severing device to the housing, said communicating means including means for rotating the elements of a pair each in an opposite angular direction about a longitudinal axis so that when the elements reach the insulator their positions relative to each other are substantially the same as desired in the housing, intermittently operated means for forcing the elements down said tracks, a pair of individual yieldable plungers one for each of said elements for pushing the elements into the bore of said housing, intermittently operated means for moving said plungers, and means operating said intermittently operated means in predetermined timed relation to each other.

2. In a machine for separating contact elements having a back portion and rebent end portions from a strip substantially coplanar with the back portions, said elements being two abreast in said strip and separated by a web of strip material, and then inserting a pair of said separated elements consisting of two formerly abreast in the strip into the bore of a housing so that the rebent ends cooperate to form terminal receiving jaws and the back portions engage opposite walls of the bore, the combination of intermittently operated means for severing each of two contact elements that are abreast in the strip from the web thereof, a guide and support means between the elements of said pairs and engageable with the web of the strip for supporting the strip in and prior to its entrance into the severing device, intermittently operated pusher means engageable which the strip on the guide means for moving it thereon into the severing means, intermittently operated means for individually delivering a plurality of housings to a predetermined position and supporting them in such position, a stationary member having an aperture in alignment with a housing that is in said predetermined position, a pair of plungers one of each element of a pair slidable in said aperture and movable into and out of a housing in alignment therewith, an aperture transverse to the aperture containing the plungers, a slide in said transverse aperture having a contact element supporting surface thereon adapted to be aligned with said plunger aperture whereby contact elements thereon are in alignment with the plungers and with a housing bore, chutes for receiving the contact elements after they have been separated in said severing device, said slide being movable to the outlet of said chutes to receive elements therefrom for delivery to said plunger aperture.

3. In a machine for separating contact elements having a back portion and rebent end portions from a strip substantially coplanar with the back portions, said elements being two abreast in said strip and separated by a web of strip material, and then inserting a pair of said separated elements consisting of two formerly abreast in the strip into the bore of a housing so that the rebent ends cooperate to form terminal receiving jaws and the back portions engage opposite walls of the bore, the combination of a device for severing each of two contact elements that are abreast in the strip from the web thereof, a guide and support means engageable with the web of the strip for supporting the strip in and prior to its entrance into the severing device, pusher means engageable with the strip on the guide means for moving it thereon into the severing device, mechanism for individually delivering a plurality of housings to a predetermined position and supporting them in such position, said mechanism comprising a dial having peripheral recesses extending parallel to its axis of rotation and adapted to support housings so that the housings do not turn about their own axes, said mechanism further comprising a chute for delivering housings to the recesses and a plunger for forcing housings into the chute, said chute permitting translation but not rotation of the housings, means including tracks communicating the separated contact elements in the severing device with the bore of a housing in said predetermined position whereby the elements may move from the severing device to the housing, said communicating means including means for rotating the elements about a longitudinal axis so that when the elements reach the insulator their positions relative to each other are substantially the same as desired in the housing, and a pair of individual yieldable plungers one for each of said elements for pushing the elements into the bore of said housing.

4. In a machine for separating contact elements having a back portion and rebent end portions from a strip substantially coplanar with the back portions, said elements being two abreast in said strip and separated by a web of strip material, and then inserting a pair of said separated elements consisting of two formerly abreast in the strip into the bore of a housing so that the rebent ends cooperate to form terminal receiving jaws and the back portions engage opposite walls of the bore, the combination of a device for severing each of two contact elements that are abreast in the strip from the web thereof, a guide and support means engageable with the web of the strip for supporting the strip in and prior to its entrance into the severing device, pusher means engageable with the strip on the guide means for moving it thereon into the severing device, mechanism for individually delivering a plurality of housings to a predetermined position and supporting then in such position, a stationary member having an aperture in alignment with a housing that is in said predetermined position, means yieldably pressing the aligned housing against said stationary member, a pair of plungers one for each element of a pair slidable in said aperture and movable into and out of a housing in alignment therewith, an aperture transverse to the aperture containing the plungers, a slide in said transverse aperture having a contact element supporting surface thereon adapted to be aligned with said plunger aperture whereby contact elements thereon are in alignment with the plungers and with a housing bore, chutes for receiving pairs of the contact elements after they have been separated in said severing device and twisting them angularly in opposite directions so that the rebent legs will contact each other, air jets for forcing severed elements into the chutes, said slide being movable to the outlet of said chutes to receive elements therefrom for delivery to said plunger aperture.

5. In a machine for assembling the housings and contact elements of electrical connectors wherein the elements are supplied in an integral strip, the combination of, a stationary support for the strip, a pusher for moving the strip on the support, a movable shearing blade for severing elements from the strip, a rotary feed dial for carrying housings, a feed chute having an injector at the inlet for delivering housings to the dial, a slide movable axially of said dial and having an elongated member thereon for insertion into the bore of a housing on the dial, means including intermittently operated air jets for moving contact elements from the shearing blade into alignment with the plunger, a second slide movable axially of said dial having an elongated inspection member for insertion into the bore of a connector to check the location of the elements in the housing, a drive shaft, and means operably connected to the drive shaft for operating in timed relation the pusher, the blade, the slides, the dial, the injector, and the air jets.

6. In apparatus of the type described, mechanism for individually delivering a plurality of flanged housings to a predetermined position and supporting them in such position, said mechanism comprising a dial having peripheral recesses extending parallel to its axis of rotation and adapted to support housings so that the housings do not turn about their own axes, the flanges of said housings being outside said dial, yieldable pressure pad means holding said flanges against the side of the dial, said mechanism further comprising a chute for delivering housings to the recesses and a plunger for forcing housings into the chute, said chute providing a path of less height than the maximum width of said housings and thus permitting translation but not rotation of the housings, and an index mechanism for said dial.

7. The invention set forth in claim 6 wherein said index mechanism comprises a shaft on which the dial is mounted, friction means resisting free rotation of the shaft, a pair of oppositely directed circular ratchets fixed on said shaft, a bellcrank having one end engageable with the teeth of one ratchet to prevent rotation of the shaft, and pawls driven by the other end of the bellcrank engageable with the teeth of the other ratchet for rotating the shaft.

8. Apparatus for assembling the housings and contact elements of electrical connectors wherein the housings are supplied in discrete form and the contact elements are in an integral strip that is supplied to the apparatus, comprising, the combination of a cut-off mechanism for severing contact elements from the strip, means for intermittently feeding the strip in timed relation to the operation of the cut-off mechanism, intermittently operated means operated in timed relation to operation of said cut-off mechanism for feeding a housing to and holding it in a predetermined location, a plunger mechanism in alignment with the interior of a housing in said location, said plunger mechanism containing a reciprocable plunger that is movable into a housing in said location and movable out of said housing to a location spaced from the end thereof, means operated in timed relation to operation of said cut-off mechanism for moving the contact elements from the cut-off mechanism to a location in alignment with said plunger and with a housing in said predetermined location, and means for operating said plunger mechanism in timed relation to operation of said cut-off mechanism and said feeding means.

9. In a machine for assembling the housing and contact elements of electrical connectors, the combination of a feed dial containing peripheral recesses adapted to hold housings with contact elements therein so that the axes thereof are parallel to the axis of rotation of the dial, means for indexing the dial, a slide movable axially of the dial having a yieldable inspection element thereon for insertion into one end of a connector and arranged so that the element yields by virtue of abutment with the end of a contact element properly seated within the connector housing, a similar slide and yieldable inspection element for insertion in the other end of a connector, air valves for the respective inspection elements on each side of the connector and operated by movement of its element beyond the point at which it should contact a contact element, radial air jet passages in said dial opening into said recesses, air valve operators connected to said air valves, means operatively connecting said elements respectively to said operators, and air conduits connected to said passages and controlled by said air valves whereby operation of the valves by the inspection elements results in air jets to blow the faulty connector out of its recess.

References Cited in the file of this patent

UNITED STATES PATENTS

| 666,905 | Packer | Jan. 29, 1901 |
| 1,266,666 | Dillon | May 21, 1918 |
| 1,729,843 | Reich | Oct. 1, 1929 |
| 1,953,476 | Gilbert | Apr. 3, 1934 |
| 1,988,716 | Burd | Jan. 22, 1935 |
| 2,007,698 | Tear | July 9, 1935 |
| 2,086,998 | Gilbert | July 13, 1937 |
| 2,150,877 | Clark | Mar. 14, 1939 |
| 2,186,693 | Bradbury | Jan. 9, 1940 |
| 2,251,949 | Pecky | Aug. 12, 1941 |
| 2,319,251 | Mittermaier | May 18, 1943 |
| 2,324,925 | Hallowell | July 20, 1943 |
| 2,360,158 | Parks | Oct. 10, 1944 |
| 2,393,246 | Hallowell | Jan. 22, 1946 |
| 2,613,432 | Gilbert | Oct. 14, 1952 |

FOREIGN PATENTS

| 378,774 | Great Britain | Aug. 18, 1932 |